(12) United States Patent
Saito

(10) Patent No.: US 6,995,928 B2
(45) Date of Patent: Feb. 7, 2006

(54) WIDE-ANGLE OPTICAL SYSTEM FOR SOLID IMAGE PICKUP ELEMENT

(75) Inventor: Tomohiro Saito, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 10/447,174

(22) Filed: May 28, 2003

(65) Prior Publication Data

US 2004/0017615 A1 Jan. 29, 2004

(30) Foreign Application Priority Data

May 29, 2002 (JP) ............................. 2002-155970

(51) Int. Cl.
*G02B 13/18* (2006.01)
(52) U.S. Cl. ..................................... 359/718; 359/708
(58) Field of Classification Search ................ 359/708, 359/712, 717–720, 749–753, 738–739
See application file for complete search history.

(56) References Cited

U.S. PATENT DOCUMENTS

| | | | | |
|---|---|---|---|---|
| RE34,455 E | * | 11/1993 | Arai et al. | ................... 359/719 |
| 6,392,820 B1 | * | 5/2002 | Shijo et al. | .................. 359/726 |

* cited by examiner

*Primary Examiner*—Loha Ben
*Assistant Examiner*—Joseph Martinez
(74) *Attorney, Agent, or Firm*—Koda & Androlia

(57) ABSTRACT

In a wide-angle optical system for a solid image pickup element, an image pickup lens 2 is a biconvex lens, and its surface closer to an image surface is being formed into such an aspherical shape that the positive refractive power is weaker at a location more spaced in a diametrical direction apart from an optical axis. Further, the image pickup lens 2 satisfies the following condition expression (1):

$$1.3 \geq |r_1/r_2| \geq 0.8 \qquad (1)$$

wherein $r_1$ is a radius of curvature of a surface of the image pickup lens closer to an object, and $r_2$ is a radius of curvature of the surface of the image pickup lens closer to the image surface. Thus, the distortion can be corrected appropriately.

4 Claims, 10 Drawing Sheets

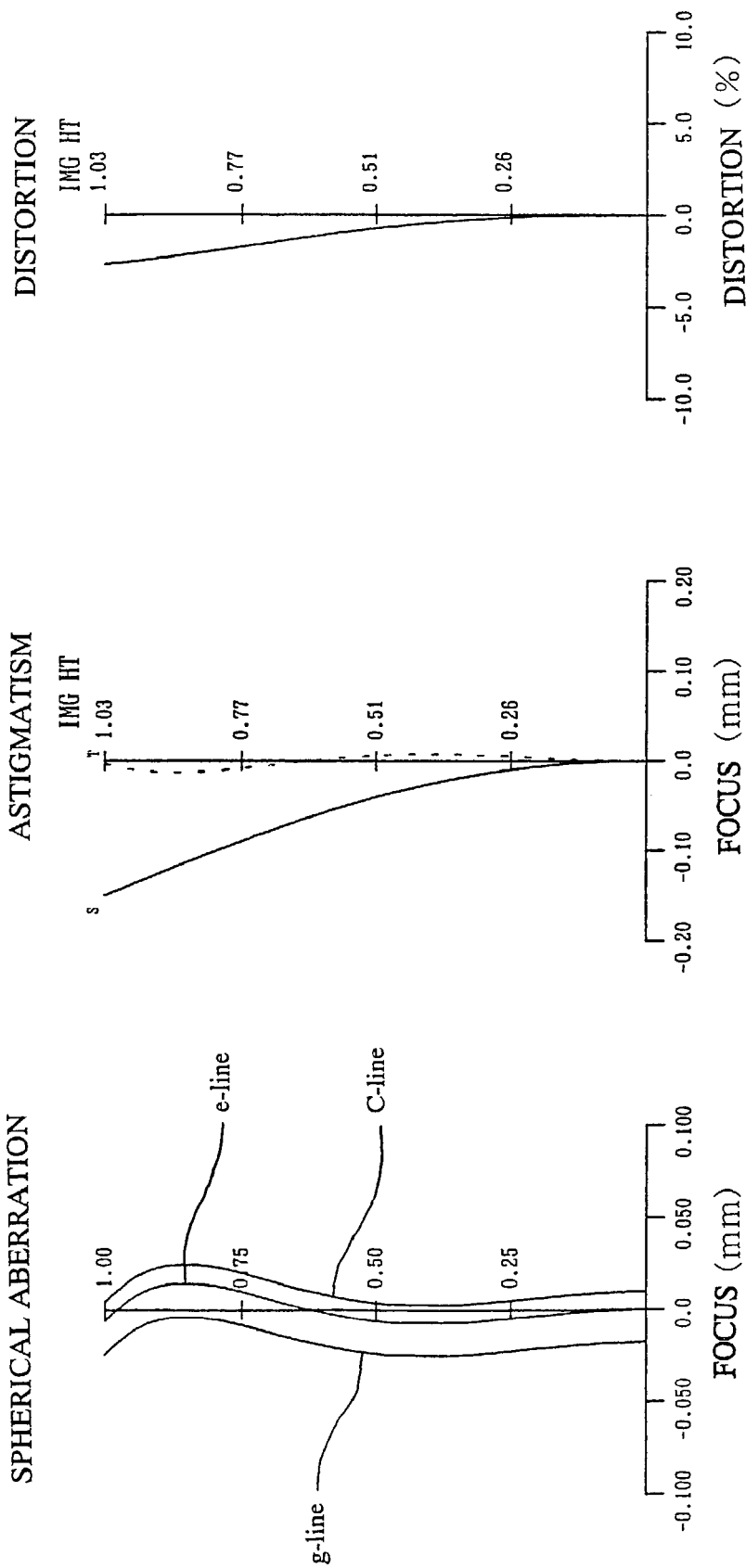
F I G. 4

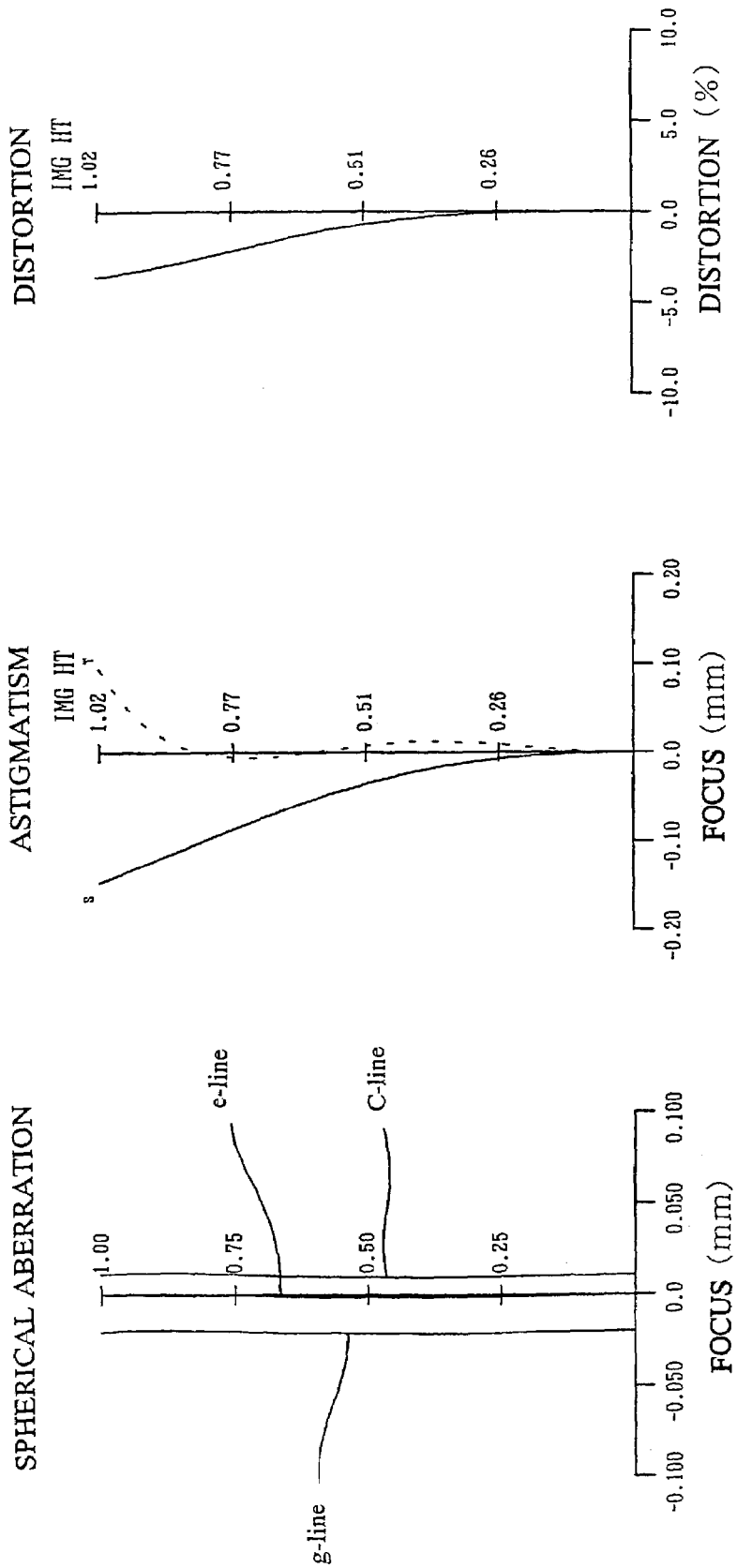
F I G. 6

WIDE-ANGLE OPTICAL SYSTEM FOR SOLID IMAGE PICKUP ELEMENT

BACKGROUND OF THE INVENTION

1. Field of the Invention

The present invention relates to a wide-angle optical system for a solid image pickup element, and particularly, to a wide-angle optical system for a solid image pickup element, which is suitable for use in an image pickup device utilizing an image pickup element mounted in a mobile telephone, a PC camera and the like.

2. Description of the Related Art

In recent years, the demand for a camera utilizing an image pickup element such as CCD, CMOS and the like adapted to be mounted in a portable computer, a visual telephone, a mobile telephone and the like has being increased with the development of multimedia.

It is desired that such a camera is small-sized and lightweight, because the camera is required to be mounted in a limited space.

Therefore, it is desired that an optical system used in such a camera is likewise small-sized and lightweight.

There are conventionally known solid image pickup elements which are suitable mounted in a mobile telephone, and which include a type having a high resolution of about 300,000 picture elements, which is called a so-called VGA, and a type having a resolution of about 110,000 picture elements, which is called a so-called CIF.

In an optical system used in such a camera, two or three lenses may be used when a higher performance is desired. However, to realize a reduction in size and a reduction in cost, a single-lens optical system is employed in many cases. Such a single-lens optical system conventionally employed includes a type in which a single image pickup lens such as a biconvex lens and a meniscus lens is incorporated.

Such conventionally known single-lens optical systems are known from Japanese Patent Application Laid-open Nos. 06-88939 and 11-264930 in which a biconvex lens is employed, and from Japanese Patent Application Laid-open No. 10-282410 in which a meniscus lens is employed.

However, such conventionally known single-lens optical system suffers from a disadvantage that although a performance sufficient to a certain degree is obtained in the viewpoint of the resolution, a large distortion remains.

The distortion offers a less problem in a case of a small displaying surface, but is more conspicuous as the displaying surface is larger. For this reason, the distortion is one of subjects which are to be required to be improved immediately.

Further, there are conventionally known single-lens optical systems described in Japanese Patent Application Laid-open Nos. 61-16314, 06-118300. Any of these single-lens optical systems is not an optical system for picking up an image, and is an optical system proposed as being used in various sensors or for photometry and thus, is different largely in respect of application from that according to the present invention. It is the actual circumstance that the angle of view is smaller (e.g., the maximum angle of view is on the order of 35°), and the solution of the above-described problem in the wide-angle image pickup optical system is not proposed at all.

SUMMARY OF THE INVENTION

Accordingly, it is an object of the present invention to provide a wide-angle optical system for a solid image pickup element, wherein the distortion can be corrected appropriately.

To achieve the above object, according to a first aspect and feature of the present invention, there is provided a wide-angle optical system for a solid image pickup element, comprising a wide-angle image pickup lens, and a diaphragm disposed on a side of the image pickup lens closer to an object, wherein the image pickup lens is a biconvex lens, its surface on a side closer to an image surface being formed into such an aspherical shape that the positive refractive power is weaker at a location more spaced in a diametrical direction apart from an optical axis, and the image pickup lens satisfies the following condition expression (1):

$$1.3 \geq |r_1/r_2| \geq 0.8 \tag{1}$$

wherein $r_1$ is a radius of curvature of the surface of the image pickup lens closer to the object, and $r_2$ is a radius of curvature of the surface of the image pickup lens closer to the image surface.

With the first feature, it is possible to correct the distortion effectively, while maintaining a telecentric property and further a back focal length by setting the absolute value of a ratio of the radius of curvature of the surface of the image pickup lens closer to the object to the radius of curvature of the surface of the image pickup lens closer to the image surface to meet the condition expression (1).

According to a second aspect and feature of the present invention, in addition to the first feature, the image pickup lens satisfies the following condition expression:

$$1.5 \geq d/fl \geq 0.7 \tag{2}$$

wherein d is a thickness of the image pickup lens at its center, and fl is a focal length of the image pickup lens.

With the second feature, it is possible to correct the distortion effectively, while suppressing the occurrence of the curvature of field to maintain a good image quality particularly in a peripheral area, by setting the ratio of the thickness of the image pickup lens at its center to the focal length to meet the expression (2).

According to a third aspect and feature of the present invention, in addition to the second feature, the image pickup lens further satisfies the following condition expression (3):

$$1.5 \geq |r_2/fl| \geq 0.7 \tag{3}$$

With the third feature, it is possible to correct the distortion effectively, while maintaining a telecentric property and further a back focal length, by setting the absolute value of the ratio of the radius of curvature at the center of the surface of the image pickup lens closer to the image surface to the focal length to meet the expression (3).

According to a fourth aspect and feature of the present invention, there is provided a wide-angle optical system for a solid image pickup element, comprising a wide-angle image pickup lens, and a diaphragm disposed on a side of the image pickup lens closer to an object, wherein the image pickup lens is a biconvex lens, its surface on a side closer to an image surface being formed into such an aspherical shape that the positive refractive power is weaker at a location more spaced in a diametrical direction apart from an optical axis, and the image pickup lens satisfies the following condition expressions:

$$1.5 \geq d/fl \geq 0.7 \quad (2)$$

and $$1.5 \geq r_2/fl \geq 0.7 \quad (3)$$

wherein d is a thickness of the image pickup lens at its center; fl is a focal length of the image pickup lens; and $r_2$ is a radius of curvature of the surface of the image pickup lens closer to the image surface.

With the fourth feature, it is possible to correct the distortion effectively, while maintaining a telecentric property and further a back focal length, by constructing the optical system to meet the condition expressions (2) and (3). Further, it is possible to carry out the effective correction of the distortion, while suppressing the occurrence of the curvature of field particularly in a peripheral area to maintain a good image quality.

According to a fifth aspect and feature of the present invention, in addition to any of the first to fourth features, the image pickup lens satisfies the following condition expression:

$$0.4 \geq SH/fl \geq 0.2 \quad (4)$$

wherein SH is a distance from a main point on a front side of the image pickup lens to the diaphragm.

With the fifth feature, it is possible to maintain both of the size of the entire optical system and a telecentric property with a good balance and appropriately by constructing the optical system so that the ratio of the distance from the main point on the front side of the image pickup lens to the diaphragm to the focal length of the image pickup lens satisfies the condition expression (4).

The above and other objects, features and advantages of the invention will become apparent from the following description of the preferred embodiment taken in conjunction with the accompanying drawings.

BRIEF DESCRIPTION OF THE DRAWINGS

FIG. 4 is a diagram showing the spherical aberration, the astigmatism and the distortion in the wide-angle optical system for the solid image pickup element shown in FIG. 3;

FIG. 6 is a diagram showing the spherical aberration, the astigmatism and the distortion in the wide-angle optical system for the solid image pickup element shown in FIG. 5;

DESCRIPTION OF THE PREFERRED EMBODIMENT

The present invention will now be described by way of a preferred embodiment with reference to FIGS. 1 and 2.

Figure 1:
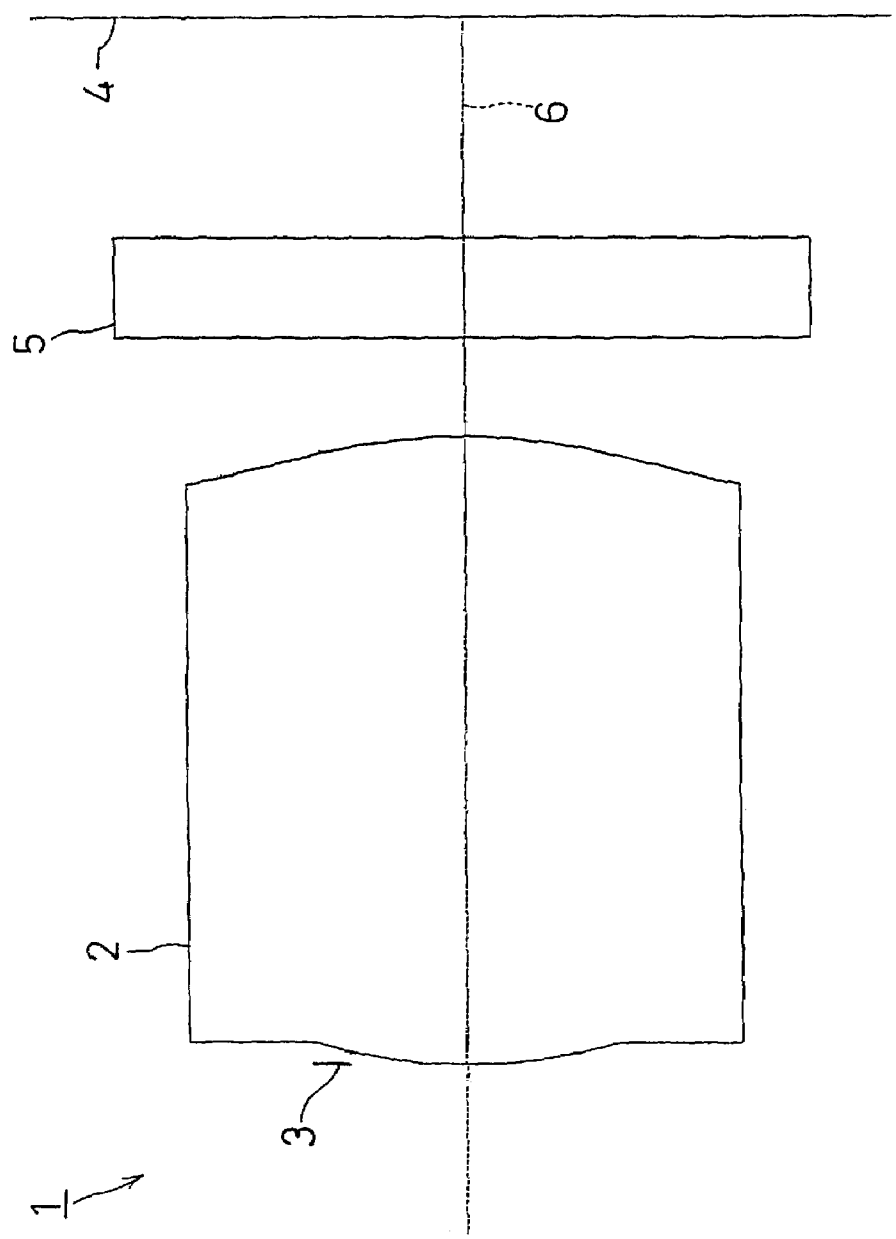
FIG. 1 is a schematic illustration showing an embodiment of a wide-angle optical system for a solid image pickup element according to the present invention.
Figure 2:
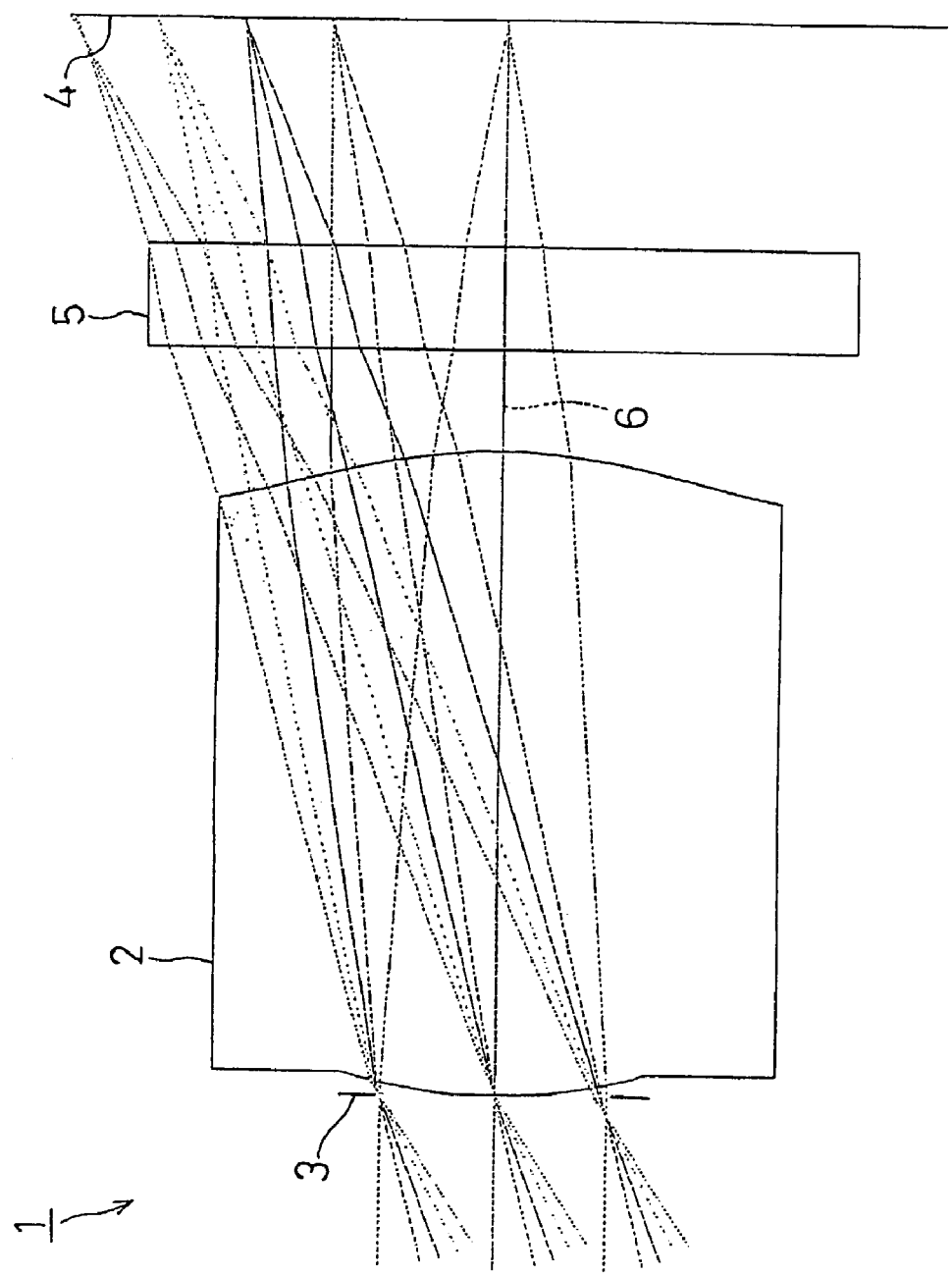
FIG. 2 is a schematic illustration similar to FIG. 1, showing a state in which light rays enter into an image surface from a side of an object in the embodiment of the wide-angle optical system for the solid image pickup element according to the present invention.

FIGS. 1 and 2 show an embodiment of a wide-angle optical system for a solid image pickup element according to the present invention. The wide-angle optical system 1 for the solid image pickup element is designed so that a maximum angle of view (an angle of diagonal view) is equal to or larger than 55°.

The wide-angle optical system 1 for the solid image pickup element includes an image pickup lens 2 made of a plastic material or the like, and a diaphragm 3 is disposed on a side of the image pickup lens 2 closer to an object, as shown in FIGS. 1 and 2.

On the other hand, an image pickup surface 4, which is a light-receiving surface of an image pickup element such as CCD or CMOS, is disposed on a side of the image pickup lens 2 closer to an image surface.

A cover glass 5 is disposed between the image pickup lens 2 and the image pickup surface 4. The cover glass 5 is disposed as required and is not necessarily required. An infrared cut filter or low-pass filter or the like may be disposed in addition to or in place of the cover glass 5.

Further, in the present embodiment, the image pickup lens 2 is a biconvex lens, and at least a surface (a second surface) of the biconvex lens closer to the image surface is aspherical surface of such a shape that the positive refractive power is weaker at a location more spaced diametrically from an optical axis 6. Furthermore, the image pickup lens 2 satisfies the following condition expression (1):

$$1.3 \geq |r_1/r_2| \geq 0.8 \quad (1)$$

wherein $r_1$ in the expression (1) is a radius of curvature at the center of the surface (the first surface) of the image pickup lens 2 closer to the object, and $r_2$ is a radius of curvature at the center of the surface of the image pickup lens 2 closer to the image surface. $|r_1/r_2|$ is an absolute value of a ratio of the radius of curvature at the center of the surface of the image pickup lens 2 closer to the object to the radius of curvature at the center of the surface of the image pickup lens 2 closer to the image surface.

If the value of $|r_1/r_2|$ is increased to exceed a value (1.3) shown in the expression (1), a power on the surface of the image pickup lens 2 closer to the image surface is too strong and hence, the distortion cannot be corrected effectively. On the other hand, if the value of $|r_1/r_2|$ is smaller than a value (0.8) shown in the expression (1), the distortion can be corrected, but a light beam (light flux) entering into the solid image pickup element has a large angle with respect to the optical axis 6, and a so-called telecentric property cannot be maintained appropriately. In addition, a back focal length, i.e., an appropriate distance between a top of the surface of the image pickup lens 2 closer to the image surface and the image pickup surface 4 cannot be maintained and for this reason, it is feared that the following disadvantage in the structure is arisen: For example, any of various filters cannot be inserted between the image pickup surface 4 and the image pickup lens 2.

Therefore, according to the present embodiment, it is possible to correct the distortion effectively, while maintaining the telecentric property and further the back focal length by setting the value of $|r_1/r_2|$ to meet the condition expression (1).

It is more desirable that the value of $|r_1/r_2|$ is more preferably set in a range of $1.2 \geq |r_1/r_2| \geq 0.9$.

Further, the image pickup lens 2 satisfies the following condition expression (2) in the present embodiment:

$$1.5 \geq d/fl \geq 0.7 \qquad (2)$$

wherein d in the expression (2) is a thickness of the image pickup lens 2 at its center, and fl is a focal length of the image pickup lens 2. In addition, d/fl is a ratio of the thickness of the image pickup lens 2 at its center to the focal length of the image pickup lens 2.

When the value of d/fl is increased to exceed a value (1.5) shown in the expression (2), the size of the image pickup lens 2 is increased not only in a direction of the optical axis 6 (thickness) but also in a diametrical direction perpendicular to the optical axis 6 and hence, it is difficult to reduce the size of the optical system. In addition, a curvature of field occurs and hence, a good image quality can be maintained at the center of the displayed image, but cannot be maintained in a peripheral area of the displayed image.

On the other hand, when the value of d/fl is smaller than a value (0.7) in the expression (2), the distortion cannot be corrected effectively.

According to the present embodiment, the occurrence of the curving of the image surface can be suppressed, and the distortion can be corrected effectively, while maintaining a good image quality particularly in the peripheral area, by meeting the value of d/fl in the condition expression (2).

It is more desirable that the value of d/fl is more preferably set in a range of $1.3 \geq d/fl \geq 0.8$.

Further, the image pickup lens 2 meets the following condition expression (3) in the present embodiment:

$$1.5 \geq |r_2/fl| \geq 0.7 \qquad (3)$$

wherein $r_2$ is the radius of curvature at the center of the surface of the image pickup lens 2 closer to the image surface, and fl is the focal length of the image pickup lens 2, as described above. In addition, $|r_2/fl|$ is an absolute value of a ratio of the radius of curvature at the center of the surface of the image pickup lens 2 closer to the image surface to the focal length of the image pickup lens 2.

If the value of $|r_2/fl|$ is smaller than a value (0.7) shown in the expression (3), a power on the surface of the image pickup lens closer to the image surface is too strong and hence, the distortion cannot be corrected effectively. On the other hand, if the value of $|r_2/fl|$ is increased to exceed a value (1.5) shown in the expression (3), the distortion can be corrected, but a light beam (a light flux) entering into a sensor for the solid image pickup element has a large angle with respect to the optical axis 6, and a so-called telecentric property cannot be maintained appropriately. Further, it is also difficult to maintain an appropriate back focal length.

Therefore, according to the present embodiment, it is possible to correct the distortion effectively, while maintaining the telecentric property and further the back focal length by setting the value of $|r_2/fl|$ to meet the condition expression (3). This effect is substantially the same as the effect provided by meeting the expression (1).

It is more desirable that the value of $|r_2/fl|$ is more preferably set in a range of $1.3 \geq |r_2/fl| \geq 0.8$.

Further, the following condition expression (4) is met in the present embodiment:

$$0.4 \geq SH/fl \geq 0.2 \qquad (4)$$

wherein SH is a distance from a main point on a front side of the image pickup lens 2 to the diaphragm, and fl is the focal length of the image pickup lens 2, as described above. In addition, SH/fl is a ratio of the main point on a front side of the image pickup lens 2 to the diaphragm to the focal length of the image pickup lens 2.

If the value of SH/fl is increased to exceed a value (0.4) shown in the expression (4), the size of the entire optical system is increased, and it is difficult to realize a reduction on size of an image pickup device itself. On the other hand, if the value of SH/fl is smaller than a value (0.2) shown in the expression (4), the telecentric property cannot be maintained appropriately.

Therefore, in the present embodiment, it is possible to maintain the telecentric property more appropriately, while maintaining the size of the entire optical system (without an increase in size) by setting the ratio of the main point on a front side of the image pickup lens 2 to the diaphragm to the focal length of the image pickup lens 2 to meet the condition expression (4).

In the image pickup lens used in the present invention, the focal length thereof is particularly not limited, but from the viewpoint that the distortion is corrected appropriately, by effectively utilizing the feature of the present invention, it is more preferable that the present invention is applied to an optical system in which the focal length of the image pickup lens 2 is equal to or smaller than 2.5 mm.

EXAMPLES

Examples of the present invention will now be described with reference to FIGS. 3 to 10.

In Examples, fl represents a focal length (mm) of an image pickup lens 2; FNo represents an F number; i represents an i-th optical face in an order from the side of an object to an image surface; $r_i$ (mm) represents a radius of curvature of the i-th optical face at its center; $d_i$ (mm) represents an optical face next to the i-th optical face in the order from the side of the object; ω represents an angle of half view, wherein 2ω two times the half angle of view is an angle of full view (an angle of diagonal view); nd represents an index of refraction; and vd represents an Abbe constant.

Each of k, a, b, c and d represents a factor in the following equation (5). More specifically, If a Z axis is taken in a direction of an optical axis; an X axis is taken in a direction perpendicular to the optical axis; a direction of travel of light is defined to be positive; k is a conical factor; and a, b, c and d are aspherical factors, the aspherical shape of the lens is represented by the following equation:

$$Z(x) = cx^2/[1+\{1-(k+1)c^2x^2\}^{1/2}] + ax^4 + bx^6 + cx8 + dx^{10} \qquad (5)$$

First Example

Figure 3:
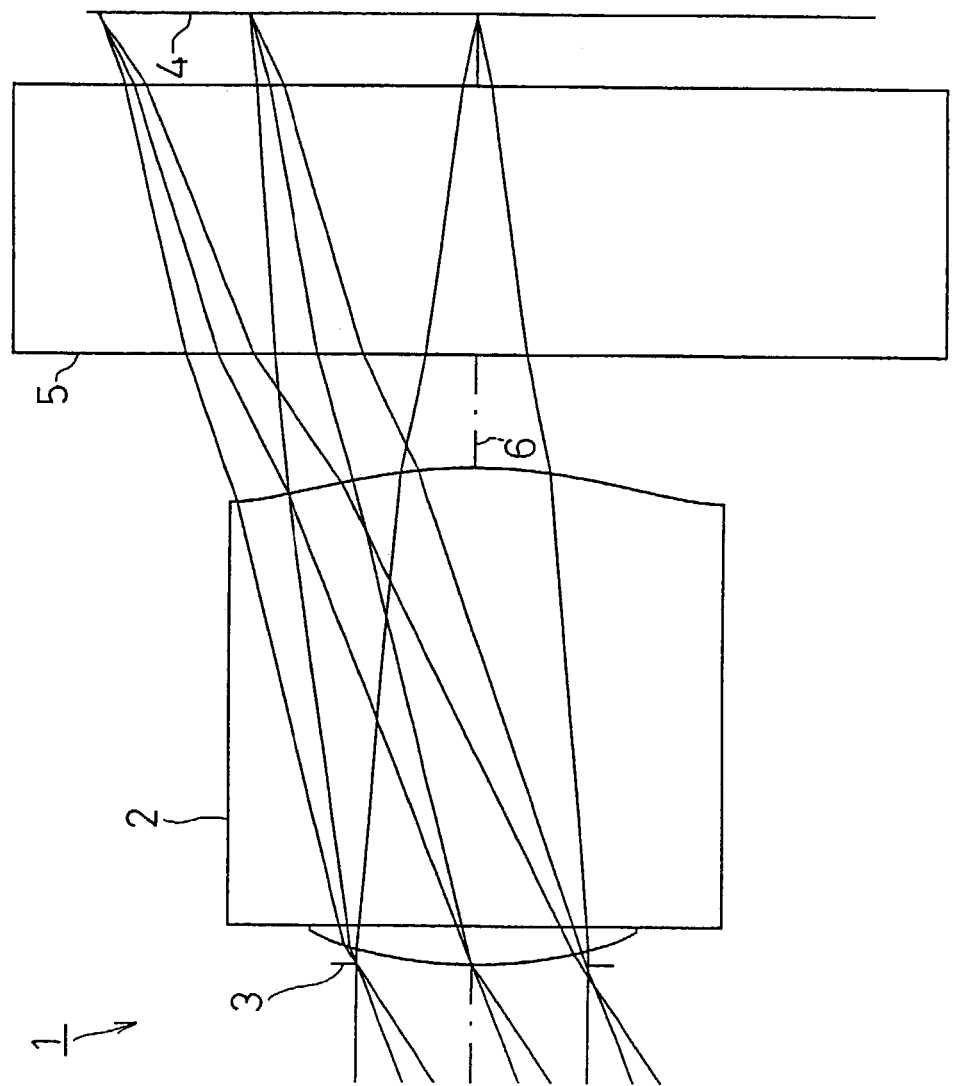
FIG. 3 is a schematic illustration showing a first example of a wide-angle optical system for a solid image pickup element according to the present invention.

FIG. 3 shows a first example of the present invention. In this example, a diaphragm 3 is disposed on a side of an image pickup lens 2 closer to an object, and a cover glass 5 is disposed on a side of the image pickup lens 2 closer to an image surface, as in the wide-angle optical system for the solid image pickup element shown in FIG. 1.

The image pickup lens 2 in the first example is set under the following conditions:

fl = 1.50 mm; FNo = 2.4; and 2ω = 70°

| i | $r_i$ | $d_i$ | nd | υd |
|---|---|---|---|---|
| 1 (Diaphragm) | 0.000 | 0.00 | | |
| 2 (First face of image pickup lens) | 1.200 | 1.30 | 1.513 | 58.0 |
| 3 (Second face of image pickup lens) | −1.370 | 0.30 | | |
| 4 (First face of cover glass) | 0.000 | 0.70 | 1.518 | 64.0 |
| 5 (Second face of cover glass) | 0.000 | 0.19 | | |
| 6 (Image pickup surface) | 0.000 | 0.00 | | |

Aspherical factor

| i | k | a | b | c | d |
|---|---|---|---|---|---|
| 2 | −2.00e−001 | 1.75e−001 | −5.82e+000 | 3.59e+001 | −1.00e+001 |
| 3 | −9.30e−001 | 2.67e−001 | 2.33e−003 | 2.76e−001 | 3.00e−001 |

Under such conditions, $|r_1/r_2|=0.876$, which meets the expression (1). In addition, $d/fl=0.867$, which meets the expression (2). Further, $|r_2/fl|=0.1913$, and $SH/fl=0.323$, which meets the expressions (3) and (4).

The aspherical aberration, the astigmatism and the distortion in the wide-angle optical system 1 for the solid image pickup element in the first example are shown in FIG. 4. It can be seen from FIG. 4 that the distortion can be suppressed sufficiently, and a good performance can be exhibited. In addition, substantially satisfactory results were obtained for the aspherical aberration and the astigmatism.

Second Example

Figure 5:
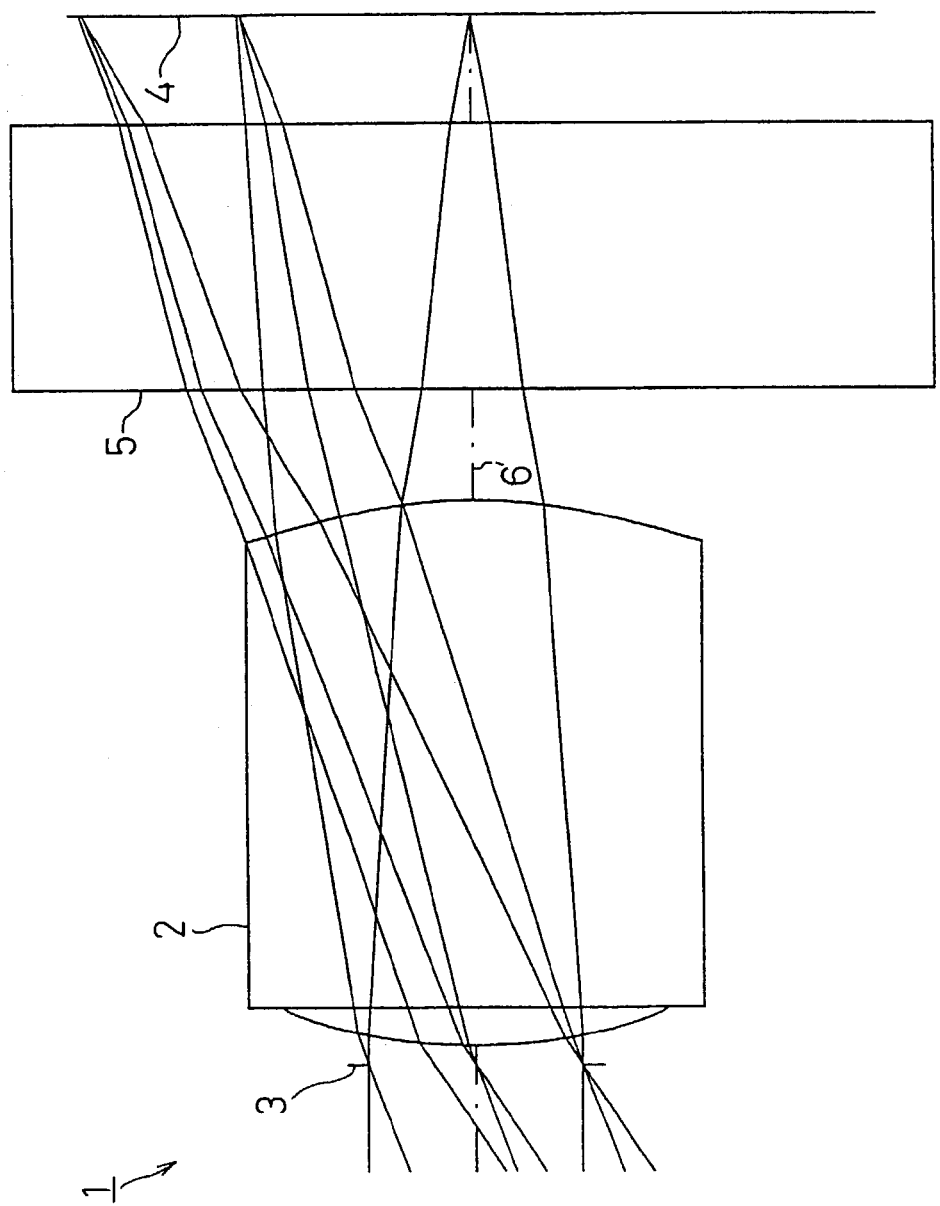
FIG. 5 is a schematic illustration showing a second example of a wide-angle optical system for a solid image pickup element according to the present invention.

FIG. 5 shows a second example of the present invention. In this example, a diaphragm 3 is disposed on a side of an image pickup lens 2 closer to an object, and a cover glass 5 is disposed on a side of the image pickup lens 2 closer to an image surface, as in the wide-angle optical system for the solid image pickup element shown in FIG. 1.

The image pickup lens 2 in the second example is set under the following conditions:

fl = 1.60 mm; FNo = 2.8; and 2ω = 67°

| i | $r_i$ | $d_i$ | nd | υd |
|---|---|---|---|---|
| 1 (Diaphragm) | 0.000 | 0.00 | | |
| 2 (First face of image pickup lens) | 1.450 | 1.45 | 1.525 | 56.0 |
| 3 (Second face of image pickup lens) | −1.325 | 0.30 | | |
| 4 (First face of cover glass) | 0.000 | 0.70 | 1.518 | 64.0 |
| 5 (Second face of cover glass) | 0.000 | 0.29 | | |
| 6 (Image pickup surface) | 0.000 | 0.0000 | | |

Aspherical factor

| i | k | a | b | c | d |
|---|---|---|---|---|---|
| 2 | 2.44e+000 | 9.00e−002 | −1.80e+000 | 7.05e+000 | −5.00e+000 |
| 3 | −2.33e+000 | 1.27e−001 | −2.43e−001 | 6.51e−001 | 0.00e+000 |

Under such conditions, $|r_1/r_2|=1.094$, which meets the expression (1). In addition, $d/fl=0.906$, which meets the expression (2). Further, $|r_2/fl|=0.828$, and $SH/fl=0.378$, which meets the expressions (3) and (4).

The aspherical aberration, the astigmatism and the distortion in the wide-angle optical system 1 for the solid image pickup element in the second example are shown in FIG. 6. It can be seen from FIG. 6 that the distortion can be suppressed sufficiently, and a good performance can be exhibited. In addition, substantially satisfactory results were obtained for the aspherical aberration and the astigmatism.

Third Example

Figure 7:
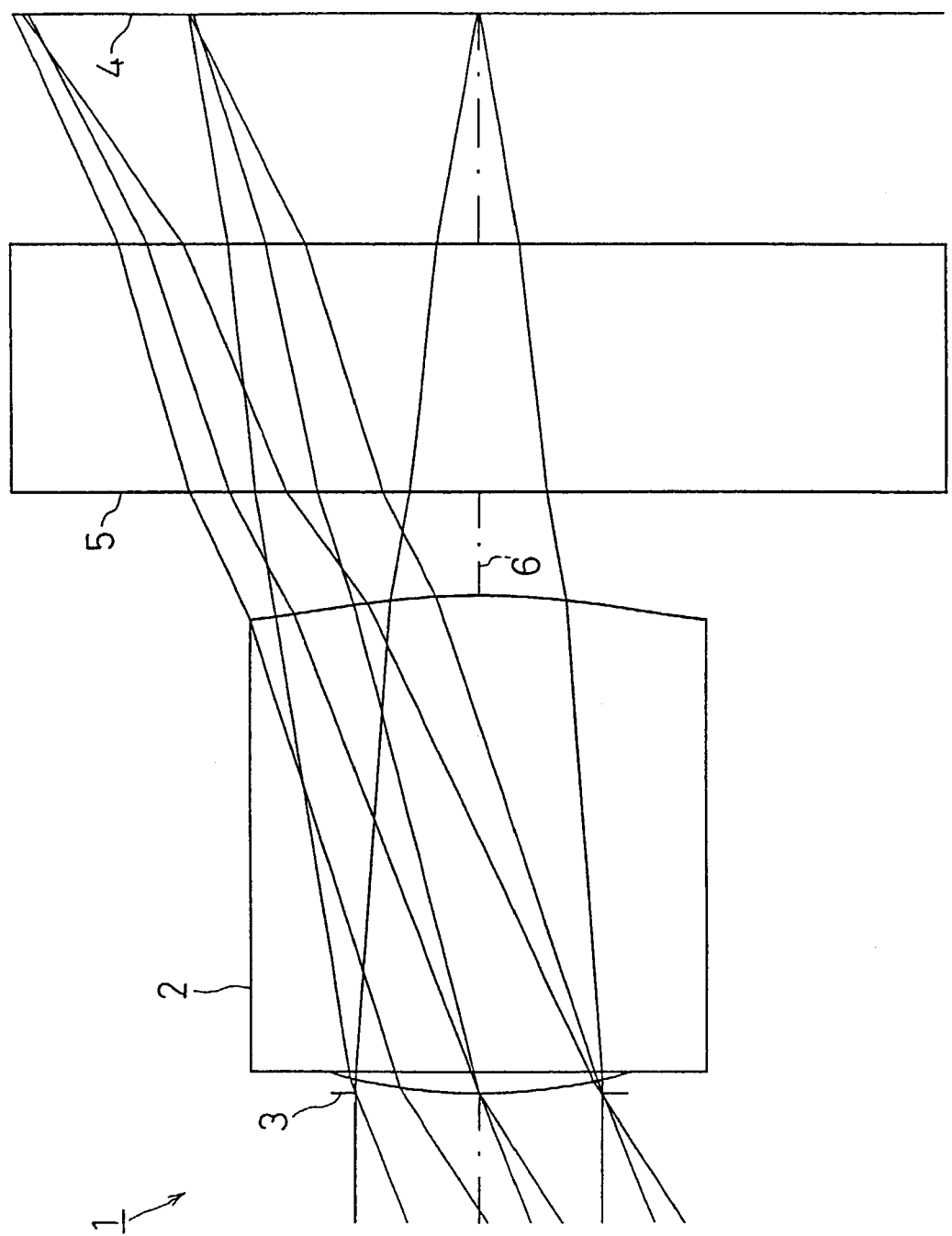
FIG. 7 is a schematic illustration showing a third example of a wide-angle optical system for a solid image pickup element according to the present invention.

FIG. 7 shows a third example of the present invention. In this example, a diaphragm 3 is disposed on a side of an image pickup lens 2 closer to an object, and a cover glass 5 is disposed on a side of the image pickup lens 2 closer to an image surface, as in the wide-angle optical system for the solid image pickup element shown in FIG. 1.

The image pickup lens 2 in the third example is set under the following conditions:

fl = 2.00 mm; FNo = 2.8; and 2ω = 67°

| i | $r_i$ | $d_i$ | nd | υd |
|---|---|---|---|---|
| 1 (Diaphragm) | 0.000 | 0.00 | | |
| 2 (First face of image pickup lens) | 1.650 | 1.41 | 1.525 | 56.0 |
| 3 (Second face of image pickup lens) | −2.060 | 0.30 | | |
| 4 (First face of cover glass) | 0.000 | 0.70 | 1.518 | 64.0 |
| 5 (Second face of cover glass) | 0.000 | 0.65 | | |
| 6 (Image pickup surface) | 0.000 | 0.00 | | |

Aspherical factor

| i | k | a | b | c | d |
|---|---|---|---|---|---|
| 2 | 6.51e+000 | 2.34e−001 | −8.51e+000 | 3.49e+001 | 1.00e+000 |
| 3 | −1.32e+000 | 1.96e−001 | −2.30e−001 | 4.13e−001 | 3.88e−002 |

Under such conditions, $|r_1/r_2|=0.801$, which meets the expression (1). In addition, $d/fl=0.825$, which meets the expression (2). Further, $|r_2/fl|=1.030$, and $SH/fl=0.236$, which meets the expressions (3) and (4).

Figure 8:
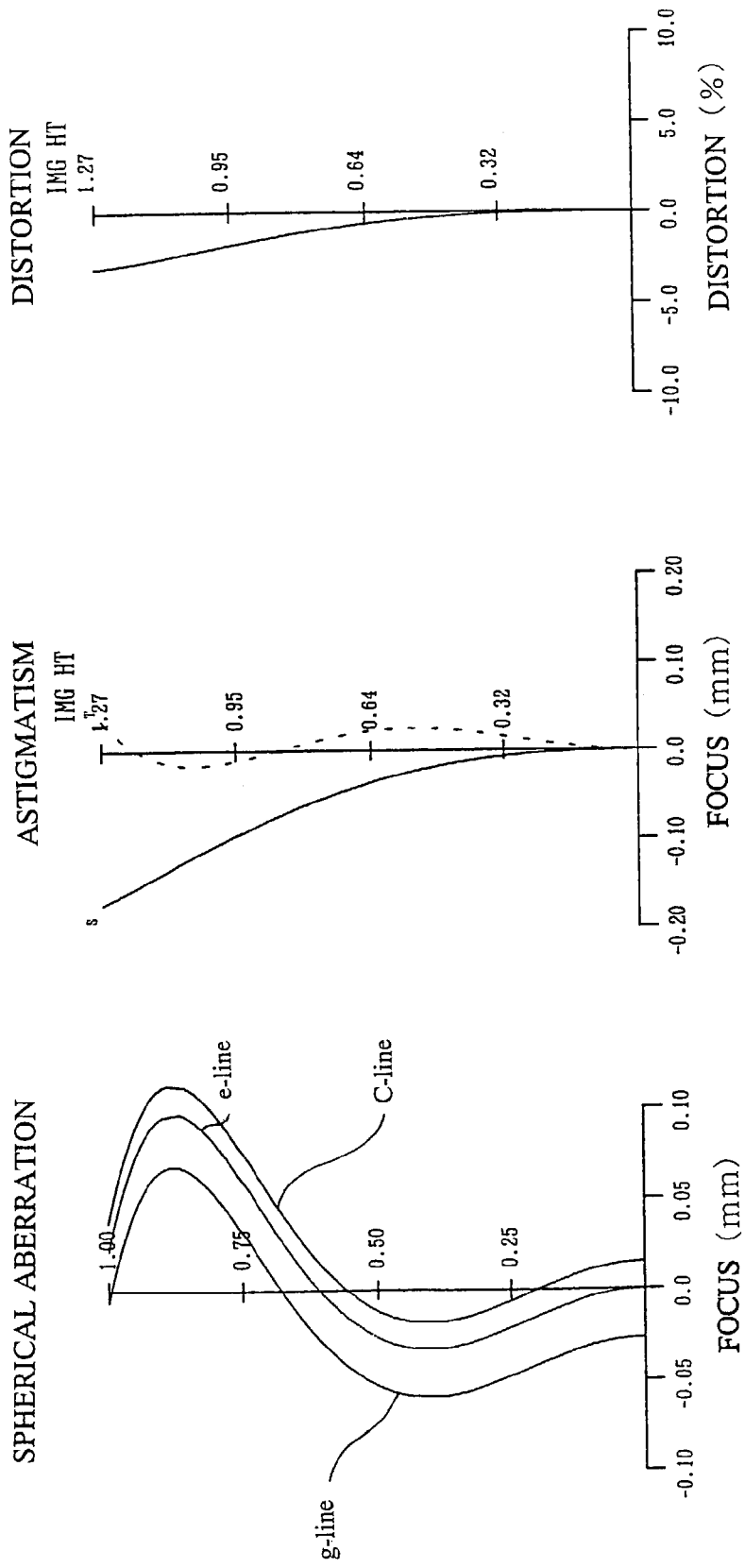
FIG. 8 is a diagram showing the spherical aberration, the astigmatism and the distortion in the wide-angle optical system for the solid image pickup element shown in FIG. 7.

The aspherical aberration, the astigmatism and the distortion in the wide-angle optical system 1 for the solid image pickup element in the third example are shown in FIG. 8. It can be seen from FIG. 8 that the distortion can be suppressed sufficiently, and a good performance can be exhibited. In addition, substantially satisfactory results were obtained for the aspherical aberration and the astigmatism.

Fourth Example

Figure 9:
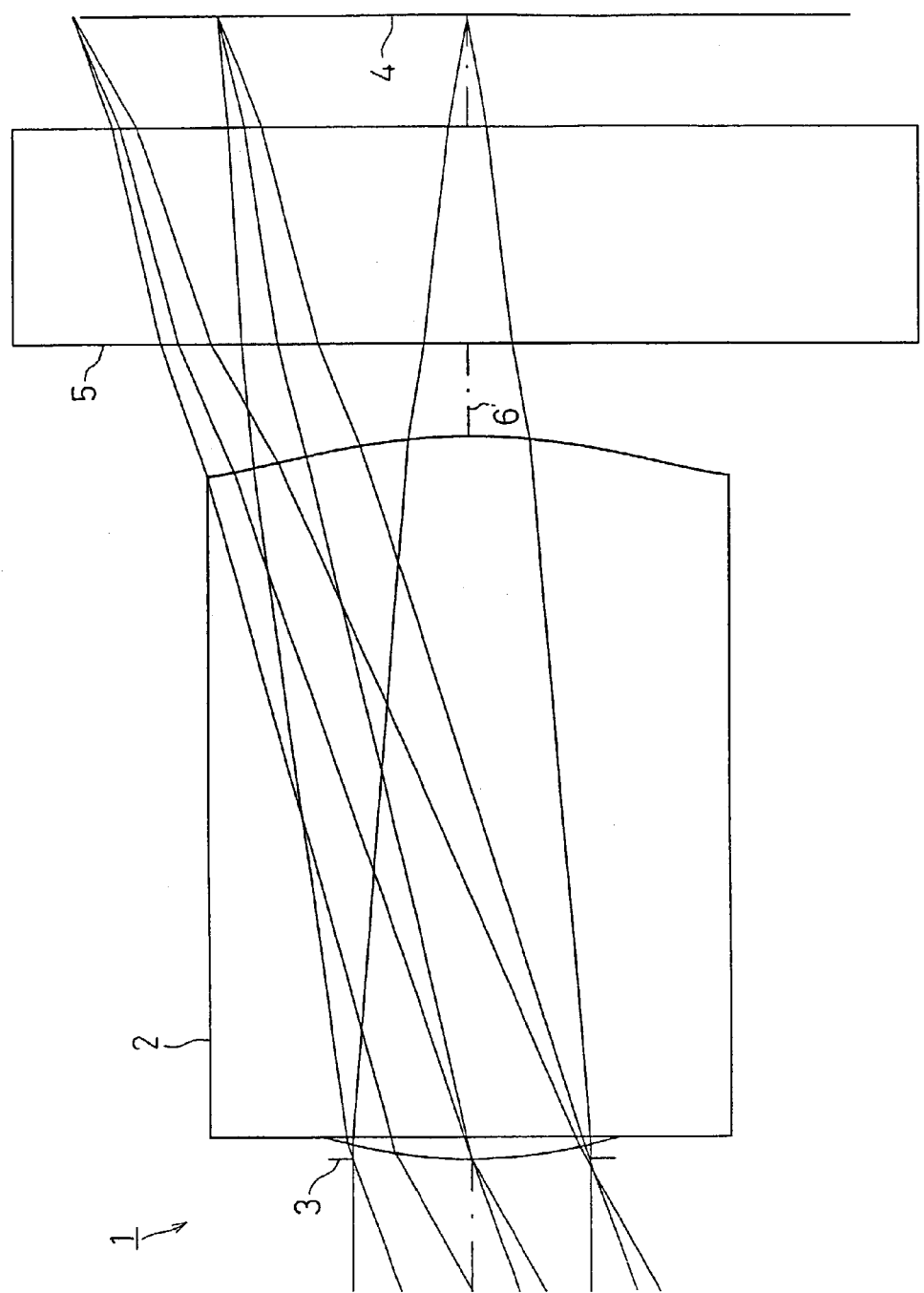
FIG. 9 is a schematic illustration showing a fourth example of a wide-angle optical system for a solid image pickup element according to the present invention.

FIG. 9 shows a fourth example of the present invention. In this example, a diaphragm 3 is disposed on a side of an image pickup lens 2 closer to an object, and a cover glass 5 is disposed on a side of the image pickup lens 2 closer to an image surface, as in the wide-angle optical system for the solid image pickup element shown in FIG. 1.

The image pickup lens 2 in the fourth example is set under the following conditions:

fl = 2.20 mm; FNo = 2.8; and 2ω = 60°

| i | $r_i$ | $d_i$ | nd | υd |
|---|---|---|---|---|
| 1 (Diaphragm) | 0.000 | 0.00 | | |
| 2 (First face of image pickup lens) | 1.650 | 2.35 | 1.525 | 56.0 |
| 3 (Second face of image pickup lens) | −2.000 | 0.30 | | |
| 4 (First face of cover glass) | 0.000 | 0.70 | 1.518 | 64.0 |
| 5 (Second face of cover glass) | 0.000 | 0.36 | | |
| 6 (Image pickup surface) | 0.000 | 0.00 | | |

-continued

| | | Aspherical factor | | | |
|---|---|---|---|---|---|
| i | k | a | b | c | d |
| 2 | −1.02e+001 | 2.13e−001 | 3.90e−001 | −2.48e+000 | 1.00e+000 |
| 3 | 3.45e−001 | 8.00e−002 | 9.31e−002 | −7.32e−002 | 3.88e−002 |

Under such conditions, $|r_1/r_2|=0.825$, which meets the expression (1). In addition, $d/fl=1.068$, which meets the expression (2). Further, $|r_2/fl|=0.919$, and $SH/fl=0.405$, which meets the expressions (3) and (4).

Figure 10:
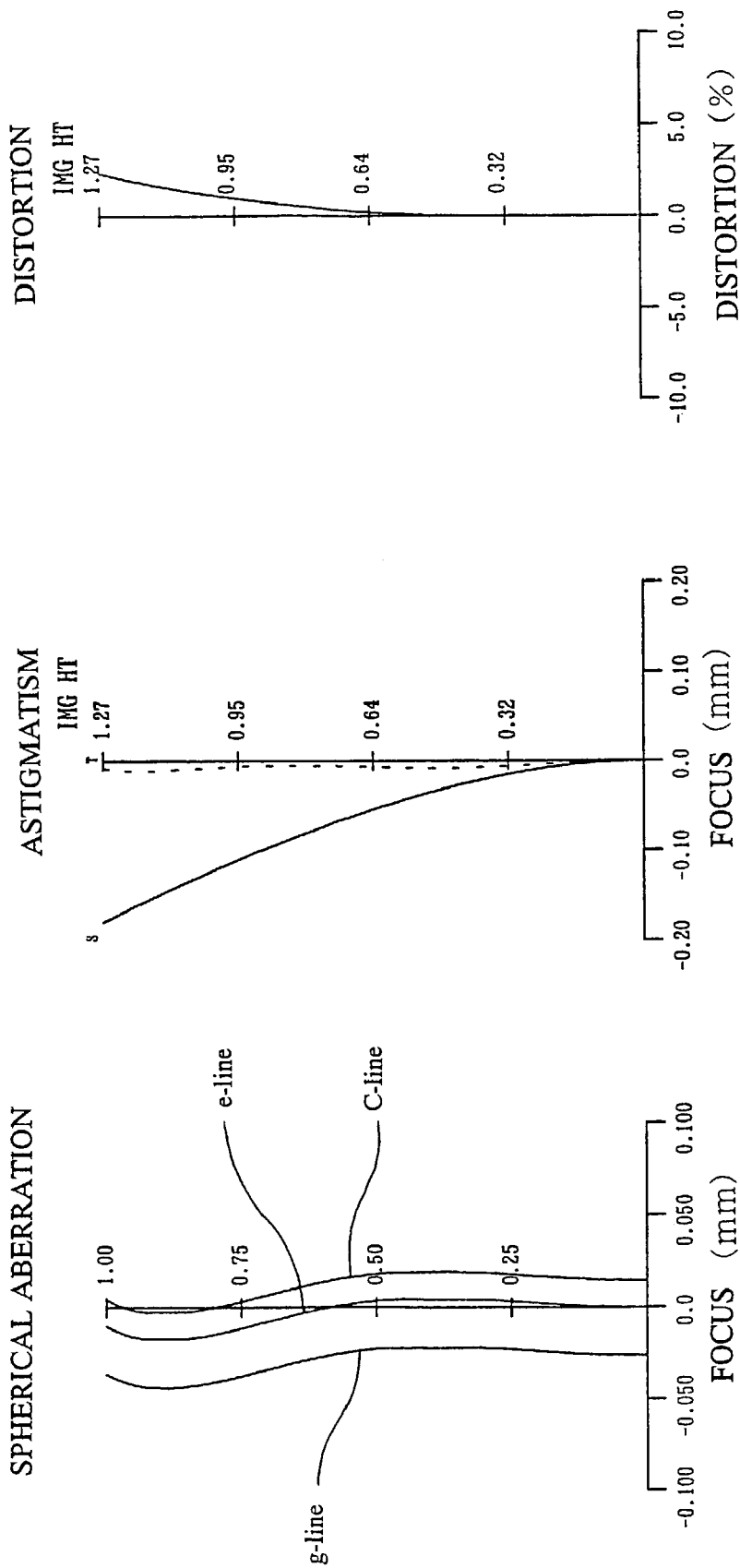
FIG. 10 is a diagram showing the spherical aberration, the astigmatism and the distortion in the wide-angle optical system for the solid image pickup element shown in FIG. 9.

The aspherical aberration, the astigmatism and the distortion in the wide-angle optical system 1 for the solid image pickup element in the fourth example are shown in FIG. 10. It can be seen from FIG. 10 that the distortion can be suppressed sufficiently, and a good performance can be exhibited. In addition, substantially satisfactory results were obtained for the aspherical aberration and the astigmatism.

Although the embodiments of the present invention have been described in detail, it will be understood that the present invention is not limited to the above-described embodiments, and various modifications in design may be made without departing from the spirit and scope of the invention defined in claims.

What is claimed is:

1. A wide angle optical system for a solid image pickup element, comprising an image pickup lens, and a diaphragm disposed on a side of the image pickup lens closer to an object, wherein said image pickup lens is a biconvex lens, its surface on a side closer to an image surface being formed into such an aspherical shape that the positive refractive power is weaker at a location more spaced in a diametrical direction apart from an optical axis, and the image pickup lens satisfies the following condition expression (1):

$$1.3 \geq |r_1/r_2| \geq 0.8 \quad (1)$$

wherein $r_1$ is a radius of curvature of the surface of the image pickup lens closer to the object, and $r_2$ is a radius curvature of the surface of the image pickup lens closer to the image surface; and wherein said image pickup lens satisfies the following condition expression:

$$0.4 \geq SH/fl \geq 0.2 \quad (4)$$

wherein SH is a distance from a main point on a front side of the image pickup lens to the diaphragm.

2. A wide-angle optical system for a solid image pickup element according to claim 1, wherein said image pickup lens satiafies the following condition expression:

$$1.5 \geq d/fl \geq 0.7 \quad (2)$$

wherein d is a thickness of the image pickup lens at its center, and fl is a focal length of the image pickup lens.

3. A wide-angle optical system for a solid image pickup element according to claim 2, wherein said image pickup lens further satisfies the following condition expression (3):

$$1.5 \geq |r_2/fl| \geq 0.7 \quad (3).$$

4. The wide angle optical system for a solid stage image pickup element according to any one of claim 1 wherein said solid image pickup element is selected from the group consisting of a CCD and CMOS.

* * * * *